United States Patent Office 2,703,322
Patented Mar. 1, 1955

2,703,322
DERIVATIVES OF ISONICOTINYL HYDRAZINE

Herman Herbert Fox, Passaic, N. J., assignor to Hoffmann-La Roche Inc., Nutley, N. J., a corporation of New Jersey No Drawing. Application March 17, 1951, Serial No. 216,256

7 Claims. (Cl. 260—295)

The present invention relates to novel derivatives of isonicotinyl hydrazine, and more particularly to 1-isonicotinyl-2-R-hydrazines wherein R stands for an alkylidene, cycloalkylidene, furfurylidene or pyrimidylidene radical.

The compounds can be represented by the following general formula:

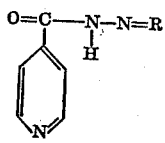

wherein R has the same meaning already assigned thereto.

Among the substances which are included in this invention are straight chain alkylidene derivatives of isonicotinyl hydrazine, e. g., 1-isonicotinyl-2-ethylidene hydrazine, 1-isonicotinyl-2-propylidene hydrazine, 1-isonicotinyl-2-butylidene hydrazine, 1-isonicotinyl-2-hexylidene hydrazine, 1-isonicotinyl-2-heptylidene hydrazine; branched chain alkylidene derivatives of isonicotinyl hydrazine, e. g., 1-isonicotinyl-2-isopropylidene hydrazine, 1-isonicotinyl-2-isobutylidene hydrazine, 1-isonicotinyl-2-(2-ethylhexylidene) hydrazine, and 1-isonicotinyl-2-(1-methylheptylidene) hydrazine; cycloalkylidene derivatives of isonicotinyl hydrazine, e. g., 1-isonicotinyl-2-cyclohexylidene hydrazine; 1-isonicotinyl-2-(2,4,6-trioxo-hexahydro-5-pyrimidylidene) hydrazine; and 1-isonicotinyl-2-(2-furfurylidene) hydrazine. The new compounds are useful to combat tuberculosis.

The new compounds can be prepared by reacting isonicotinyl hydrazine with an aliphatic aldehyde, which may be a straight chain or branched chain aldehyde; an aliphatic ketone, a cycloaliphatic ketone, alloxan or furfural, whereupon the corresponding 1-isonicotinyl-2-R-hydrazines are obtained. In general, equimolecular amounts of the reagents are employed. The reaction may be carried out in the presence of any suitable diluent. When an excess of the aldehyde or ketone is employed, the excess may serve as the diluent. The following examples will serve to illustrate the preparation of the new compounds:

Example 1

A mixture of 30 grams of isonicotinyl hydrazine, 40 cc. of acetaldehyde and 300 cc. of isopropanol was heated on a steam bath until solution was complete. Upon cooling the mixture, white crystals of practically pure 1-isonicotinyl-2-ethylidene hydrazine precipitated out. The product crystallized from isopropanol or chloroform in the form of white needles; M. P. 175.5–176° C.

Example 2

A mixture of 40 grams of isonicotinyl hydrazine and 600 cc. of acetone was heated on a steam bath until solution was complete. Upon cooling the reaction mixture, 1-isonicotinyl-2-isopropylidene hydrazine precipitated in the form of white needles; M. P. 161–161.5° C.

Example 3

Isonicotinyl hydrazine (21 grams) was dissolved in 250 cc. of water, and 15 grams of cyclohexanone were added to the clear solution. The resulting two phase system was shaken until the cyclohexanone dissolved, upon which 1-isonicotinyl-2-cyclohexylidene hydrazine began to precipitate out in the form of white needles; M. P. 167.5–169.5° C.

Example 4

A mixture of 40 grams of isonicotinyl hydrazine, 30 cc. of furfural and 200 cc. of methanol was refluxed for about 10 minutes. The reaction mixture was cooled, and the fine white needles of 1-isonicotinyl-2-(2-furfurylidene) hydrazine were filtered off. The compound melted at 217–218° C.

Example 5

A mixture of 40 grams of isonicotinyl hydrazine, 50 cc. of methyl hexyl ketone and 300 cc. of methanol was refluxed for 4 hours. The methanol was removed under vacuum, and 200 cc. of ligroin (B. P. 60–90° C.) were added to the residue. The mixture was heated on a steam bath, stirred and finally cooled, whereupon white needles of 1-isonicotinyl-2-(1-methylheptylidene)hydrazine formed. The compound melted at 75–77° C.

Example 6

Isonicotinyl hydrazine (27.4 grams) in 375 cc. of water was mixed with 32 grams of alloxan in 160 cc. of water. The white crystalline precipitate of 1-isonicotinyl-2-(2,4,6-trioxohexahydro-5-pyrimidylidene) hydrazine which formed melted with decomposition at 243.5° C.

Example 7

Isonicotinyl hydrazine (40 grams), 40 cc. of butyraldehyde and 300 cc. of methanol were mixed. Heat was evolved spontaneously, and a clear solution was obtained. The methanol and excess aldehyde were removed under vacuum. Upon cooling, the residue crystallized. Recrystallization from toluene yielded white granular crystals of 1-isonicotinyl-2-butylidene hydrazine; M. P. 113–114° C.

Example 8

Isonicotinyl hydrazine (20 grams), 20 cc. of propionaldehyde and 100 cc. of methanol were mixed. Heat was evolved spontaneously, and a clear solution was obtained. The methanol and excess aldehyde were removed under vacuum. Upon cooling, the residue crystallized. Recrystallization from ethyl acetate yielded colorless crystals of 1-isonicotinyl-2-propylidene hydrazine; M. P. 142.5–143.5° C.

Example 9

Isonicotinyl hydrazine (20 grams), 18 grams of 2-ethylhexaldehyde and 150 cc. of water were mixed, whereupon a two-phase oil-water system was formed. On shaking, the oily phase formed a white precipitate of 1-isonicotinyl-2-(2-ethylhexylidene)hydrazine. On recrystallization from a mixture of ligroin (B. P. 60–90° C.) and xylene, the compound melted at 89.5–91.5° C.

Example 10

Isonicotinyl hydrazine (20 grams), 17 grams of heptaldehyde and 150 cc. of water were mixed whereupon a two-phase oil-water system was formed. On shaking, the oily phase formed a precipitate of 1-isonicotinyl-2-heptylidene hydrazine. On recrystallization from xylene, the compound melted at 101–102° C.

Example 11

A mixture of 20 grams of isonicotinyl hydrazine, 20 cc. of hexaldehyde and 150 cc. of methanol was warmed to solution, and the methanol was then removed under vacuum. A thick syrup was obtained which gave a white precipitate of 1-isonicotinyl-2-hexylidene hydrazine on treatment with ether. On recrystallization from xylene, the compound melted at 121.5–123° C.

Example 12

To a warm solution of 20 grams of isonicotinyl hydrazine in 150 cc. of methanol were added 20 cc. of isobutyraldehyde. The mixture was permitted to stand for 15 minutes. The methanol and excess aldehyde were then removed under vacuum, whereupon 1-isonicotinyl-2-isobutylidene hydrazine was obtained as a solid. Recrystallization from benzene gave the compound in the form of colorless rhomboids; M. P. 136.5–138° C.

I claim:
1. 1-isonicotinyl-2-R-hydrazines, wherein R is a member of the group consisting of a lower alkylidene, cyclohexylidene, furfurylidene, and 2,4,6-trioxo-hexahydro-pyrimidylidene radical.
2. 1-isonicotinyl-2- lower alkylidene hydrazine.
3. 1-isonicotinyl-2-isopropylidene hydrazine.
4. 1-isonicotinyl-2-cyclohexylidene hydrazine.
5. 1-isonicotinyl-2-hexylidene hydrazine.
6. 1-isonicotinyl-2-isobutylidene hydrazine.
7. 1-isonicotinyl-2-(2-ethylhexylidene) hydrazine.

References Cited in the file of this patent

Meyer, Chemical Abstracts, vol. 6 (1912), pp. 2073–4.